(12) United States Patent
Bialon et al.

(10) Patent No.: US 11,511,719 B2
(45) Date of Patent: Nov. 29, 2022

(54) AXLE VALVE MODULE AND RELAY VALVE MODULE OF A COMPRESSED-AIR BRAKE SYSTEM

(71) Applicant: WABCO GmbH, Hannover (DE)

(72) Inventors: Rafal Bialon, Olawa (PL); Robert Otremba, Ronnenberg (DE); Detlef Schmidt, Gehrden (DE)

(73) Assignee: WABCO GmbH, Hannover (DE)

( * ) Notice: Subject to any disclaimer, the term of this patent is extended or adjusted under 35 U.S.C. 154(b) by 198 days.

(21) Appl. No.: 16/757,781

(22) PCT Filed: Sep. 3, 2018

(86) PCT No.: PCT/EP2018/073624
§ 371 (c)(1),
(2) Date: Apr. 21, 2020

(87) PCT Pub. No.: WO2019/081101
PCT Pub. Date: May 2, 2019

(65) Prior Publication Data
US 2021/0188235 A1    Jun. 24, 2021

(30) Foreign Application Priority Data

Oct. 26, 2017  (DE) .................... 10 2017 009 954.5

(51) Int. Cl.
*B60T 13/68* (2006.01)
*B60T 8/36* (2006.01)
*B60T 8/48* (2006.01)

(52) U.S. Cl.
CPC ............ *B60T 13/683* (2013.01); *B60T 8/361* (2013.01); *B60T 8/4818* (2013.01); *B60T 2270/10* (2013.01); *B60Y 2400/81* (2013.01)

(58) Field of Classification Search
CPC ........ B60T 13/68; B60T 13/683; B60T 13/70; B60T 13/26; B60T 13/268; B60T 13/261;
(Continued)

(56) References Cited

U.S. PATENT DOCUMENTS 8,651,588 B2 *  2/2014  Bensch ................... B60T 8/327
                                                     303/115.2
8,833,868 B2 *  9/2014  Bensch ................. B60T 13/385
                                                     303/113.1
(Continued)

FOREIGN PATENT DOCUMENTS

DE  102014012596 A1  3/2016
DE  102014012712 A1  3/2016
(Continued)

OTHER PUBLICATIONS

European Patent Office, Rijswijk, Netherlands, International Search Report of International Application No. PCT/EP2018/073624, dated Dec. 19, 2018, 2 pages.

*Primary Examiner* — Thomas J Williams
(74) *Attorney, Agent, or Firm* — Dickinson Wright PLLC

(57) ABSTRACT

An axle valve module of a compressed air brake system includes a relay valve with a control pressure input connected to a control pressure line which can be connected via a changeover valve alternately to a brake pressure line conducting an introduced brake pressure or to a reservoir pressure line conducting a reservoir pressure. ABS inlet and outlet valves are each formed as a pressure-controlled diaphragm valve with assigned pilot valve, wherein the pilot valves are configured as cyclically controllable 3/2-way magnetic switching valves, A shut-off valve is arranged in the control pressure line of the relay valve, between the changeover valve and the control pressure input of the relay valve or the branch point of a control pressure line of the
(Continued)

ABS valves, via which shut-off valve the control pressure present at the control pressure input of the relay valve can be locked in as required.

5 Claims, 6 Drawing Sheets

(58) Field of Classification Search
CPC ........ B60T 13/38; B60T 13/385; B60T 8/327; B60T 8/361; B60T 8/4818
See application file for complete search history.

(56) References Cited

U.S. PATENT DOCUMENTS

| | | | |
|---|---|---|---|
| 10,328,918 B2 * | 6/2019 | Howell | B60T 13/662 |
| 2006/0244305 A1 * | 11/2006 | Hilberer | B60T 17/22 |
| | | | 303/71 |
| 2011/0062774 A1 * | 3/2011 | Bensch | B60T 13/683 |
| | | | 303/9.61 |
| 2013/0214588 A1 * | 8/2013 | Kiel | B60T 15/00 |
| | | | 303/6.01 |

FOREIGN PATENT DOCUMENTS

| | | | | |
|---|---|---|---|---|
| EP | 547407 A1 * | 6/1993 | ............ | B60T 13/683 |
| EP | 0547407 A1 | 6/1993 | | |
| EP | 0616931 A1 | 9/1994 | | |
| EP | 1312524 A1 * | 5/2003 | ............ | B60T 13/265 |
| EP | 1826085 A2 | 8/2007 | | |
| JP | H01220787 A | 9/1989 | | |

* cited by examiner

AXLE VALVE MODULE AND RELAY VALVE MODULE OF A COMPRESSED-AIR BRAKE SYSTEM

TECHNICAL FIELD

The present disclosure relates to an axle valve module of a compressed air brake system for actuating the wheel brakes of a vehicle axle of a wheeled vehicle, with a relay valve, the control pressure input of which is connected to a control pressure line which can be connected via a changeover valve alternately to a brake pressure line conducting an introduced brake pressure or to a reservoir pressure line conducting a reservoir pressure; and with an ABS inlet valve and an ABS outlet valve for at least one wheel brake cylinder on each side of the vehicle axle, wherein the valves are each formed as a pressure-controlled diaphragm valve with assigned pilot valve, wherein the pilot valves are configured as cyclically controllable 3/2-way magnetic switching valves, via which a respective control pressure chamber of the assigned diaphragm valve can be loaded alternately with a control pressure taken from an axle brake line connected to the working pressure output of the relay valve or from the control pressure line of the relay valve, or with ambient pressure.

The present disclosure also concerns a relay valve module of a compressed air brake system for actuating the wheel brakes of a wheeled vehicle, with a relay valve, the control pressure input of which is connected to a control pressure line which can be connected via a changeover valve alternately to a brake pressure line conducting an introduced brake pressure or to a reservoir pressure line conducting a reservoir pressure.

BACKGROUND

EP 1 826 085 A2 describes a compressed air brake system of a wheeled vehicle, in which the control valves for actuating the wheel brakes of each vehicle axle are combined in an axle valve module. At least the axle valve module of the rear axle comprises in each case a relay valve and an ABS inlet valve and an ABS outlet valve for the wheel brake cylinders on both sides of the rear axle.

In more modern designs of such an axle valve module by WABCO GmbH, both the relay valve and the ABS inlet valves and ABS outlet valves on each side of a vehicle axle are each configured as a diaphragm valve unit, as known for example from DE 10 2014 012 596 A1 or DE 10 2014 012 712 A1. Each of these diaphragm valve units has an inlet diaphragm valve and an outlet diaphragm valve, in each of which a control pressure chamber, adjoining the respective diaphragm of the diaphragm valve concerned, can be loaded alternately with a high control pressure or ambient pressure via an assigned pilot valve. The pilot valves are configured as cyclically controllable 3/2-way magnetic switching valves. When a high control pressure is applied, the diaphragm valves are closed. When ambient pressure is applied, the diaphragm valves are opened such that the working pressure outputs are connected to the respective working pressure input by the respective inlet diaphragm valve, and to a purge output via the respective outlet diaphragm valve.

In order to allow actuation of the wheel brakes within the scope of driving safety functions, such as traction control (ASR) or automatic traction control (ATC), roll stability control (RSC), electronic stability control (ESC) or an electronic stability program (ESP), and an external braking request (XBR), independently of actuation of a brake pedal by the driver and ABS control of the wheel brakes by the ABS inlet valves and ABS outlet valves, a changeover valve is connected upstream of the control pressure input of the relay valve, by means of which the latter can be connected alternately to a brake pressure line conducting a brake pressure or to a reservoir pressure line conducting a reservoir pressure. The brake pressure is usually set by actuation of the brake pedal via a brake pedal valve mechanically connected thereto; however, on use of a so-called electronic brake pedal as a brake value emitter, it can also be set by means of an electropneumatic brake valve. The reservoir pressure is usually provided by compressed air supply system and constitutes the maximum brake pressure available.

Because of component tolerances in the ABS valves and their pilot valves, in certain functions in which the brake force on both sides of the vehicle axle should be equal, such as with an electronic brake force limiter (EBL) and automatic emergency braking by the braking assistant of an intelligent cruise control system (ACC), the brake pressures in the wheel brake cylinders on the two sides of the vehicle axle may differ, and hence the wheeled vehicle may be destabilized.

SUMMARY

The present disclosure is therefore based on the object of refining an axle valve module of a compressed air brake system of the type cited initially in a simple and economic fashion such that, within the scope of certain driving safety functions, a very largely precisely identical brake pressure can be set in the wheel brake cylinders on the two sides of the vehicle axle. Furthermore, a corresponding relay valve module of a compressed air brake system is provided, by means of which it is possible to set a precisely equal brake pressure in the connected wheel brake cylinders.

The object concerning the axle valve module is achieved in conjunction with the features of the preamble of claim 1 in that a shut-off valve is arranged in the control pressure line leading to the relay valve, between the changeover valve and the control pressure input of the relay valve or the branch point of a control pressure line for the ABS valves, by means of which shut-off valve the control pressure applied at the control pressure input of the relay valve can be locked in as required.

The present disclosure is based on a former design of an axle valve module of a compressed air brake system for actuating the wheel brakes of the vehicle axle of a wheeled vehicle, which comprises a relay valve and an ABS inlet valve and an ABS outlet valve for at least one wheel brake cylinder on each side of the vehicle axle. The control pressure input of the relay valve is connected to a control pressure line which, via a changeover valve, can be connected alternately to a brake pressure line conducting an introduced brake pressure or to a reservoir pressure line conducting a reservoir pressure. The ABS inlet valves and ABS outlet valves are each formed as a pressure-controlled diaphragm valve with an assigned pilot valve. The pilot valves are configured as cyclically controllable 3/2-way magnetic switching valves, via which respectively a control pressure chamber of the assigned diaphragm valve can be loaded alternately with a control pressure taken from an axle brake line connected to the working pressure output of the relay valve or from the control pressure line of the relay valve, or with ambient pressure.

By actuating the changeover valve, an arbitrary control pressure can be set, which is present at the control pressure input of the relay valve and lies between the brake pressure in the brake pressure line and the reservoir pressure in the reservoir pressure line, and can be locked in by actuation of the shut-off valve. This brake pressure is then also set at the working pressure output of the relay valve with corresponding air volume throughput. Thus this brake pressure is present also in the wheel brake cylinders on both sides of the vehicle axle without actuating the ABS inlet valves (which are open in non-actuated state) and the ABS outlet valves (which are closed in non-actuated state), so that the wheels on both sides of the vehicle axle are braked with identical braking force and destabilization of the wheeled vehicle is avoided. The cost of achieving this symmetrical braking function is comparatively low with the installation of the additional shut-off valve.

The shut-off valve may be configured as a cyclically controllable 2/2-way magnetic switching valve with a compressed air input and a compressed air output, each of which is connected to a portion of the control pressure line of the relay valve, and which are connected together in non-actuated state and blocked against each other in actuated state.

Alternatively, the shut-off valve may also be configured as a cyclically controllable 3/2-way magnetic switching valve with two compressed air inputs and one compressed air output, in which the first compressed air input and compressed air output, each of which is connected to a portion of the control pressure line of the relay valve, are connected together in non-actuated state and blocked against each other in actuated state, and the second compressed air input is permanently blocked.

With the latter embodiment, it may also be provided that the shut-off valve is structurally identical to the pilot valves of the ABS outlet valves or the pilot valves of the ABS inlet valves, which has advantages with respect to production technology and logistics.

To further simplify the structure of the axle valve module, it may also be provided that the changeover valve is configured as a cyclically controllable 3/2-way magnetic switching valve with a first compressed air input to which the brake pressure line is connected, with a second compressed air input to which the reservoir pressure line is connected, and with a compressed air output to which the control pressure line of the relay valve is connected, wherein the first compressed air input is connected to the compressed air output in non-actuated state and is blocked therefrom in actuated state, and the second compressed air input is blocked against the compressed air output in non-actuated state and connected thereto in actuated state. In this way, the changeover valve may be identical to the shut-off valve of the second embodiment and/or configured like the pilot valves for the ABS outlet valves or the pilot valves for the ABS inlet valves.

The object concerning the relay valve module is achieved in that a shut-off valve is arranged in the control pressure line leading to the relay valve, between the changeover valve and the control pressure input of the relay valve or the branch point of a control pressure line of connected ABS valves, and by means of the shut-off valve the control pressure present at the control pressure input of the relay valve can be locked in as required. The present disclosure is here based on a former embodiment of the relay valve module of a compressed air brake system for actuating wheel brakes of a wheeled vehicle, which comprises a relay valve. The control pressure input of the relay valve is connected to a control pressure line which can be connected alternately, via a changeover valve, to a brake pressure line conducting an introduced brake pressure or to a reservoir pressure line conducting a reservoir pressure.

By actuation of the changeover valve, an arbitrary control pressure can be set, which is present at the control pressure input of the relay valve and lies between the brake pressure in the brake pressure line and the reservoir pressure in the reservoir pressure line, and can be locked in by actuation of the shut-off valve there. This brake pressure is then also set at the working pressure output of the relay valve with corresponding air volume throughput. Thus this brake pressure is present also in the wheel brake cylinders on both sides of the vehicle axle without actuating the ABS inlet valves (which are open in non-actuated state) and the ABS outlet valves (which are closed in non-actuated state), so that the respective wheels are braked with identical braking force and destabilization of the wheeled vehicle is avoided. The cost of achieving this symmetrical braking function is comparatively low with installation of the additional shut-off valve.

The shut-off valve may be configured as a cyclically controllable 2/2-way magnetic switching valve with a compressed air input and a compressed air output, each of which is connected to a portion of the control pressure line of the relay valve, and which are connected together in non-actuated state and blocked against each other in actuated state.

Alternatively, the shut-off valve may also be configured as a cyclically controllable 3/2-way magnetic switching valve with two compressed air inputs and one compressed air output, in which the first compressed air input and the compressed air output, each of which is connected to a portion of the control pressure line of the relay valve, are connected together in non-actuated state and blocked against each other in actuated state, and the second compressed air input is permanently blocked.

To simplify the structure of the relay valve module, it may also be provided that the changeover valve is configured as a cyclically controllable 3/2-way magnetic switching valve with a first compressed air input to which the brake pressure line is connected, with a second compressed air input to which the reservoir pressure line is connected, and with a compressed air output to which the control pressure line leading to the relay valve is connected, wherein the first compressed air input is connected to the compressed air output in non-actuated state and is blocked therefrom in actuated state, and the second compressed air input is blocked against the compressed air output in non-actuated state and connected thereto in actuated state. In this way, it is possible that the changeover valve and the shut-off valve of the second embodiment are structurally identical.

Both in the relay valve module and the axle valve module explained initially, it may advantageously be provided that a pressure sensor is connected to the working pressure output of the relay valve, the measurement values from which sensor can be conducted to an electronic control device which actuates the directly i.e. electrically controlled valves. The measurement values from this pressure sensor allow pressure regulation in the sense of a closed pressure control loop.

To clarify the present disclosure further, several drawings of examples are attached to the description. The drawings are provided herewith for purely illustrative purposes and are not intended to limit the scope of the present invention.

DETAILED DESCRIPTION OF THE DRAWINGS

Figure 3:
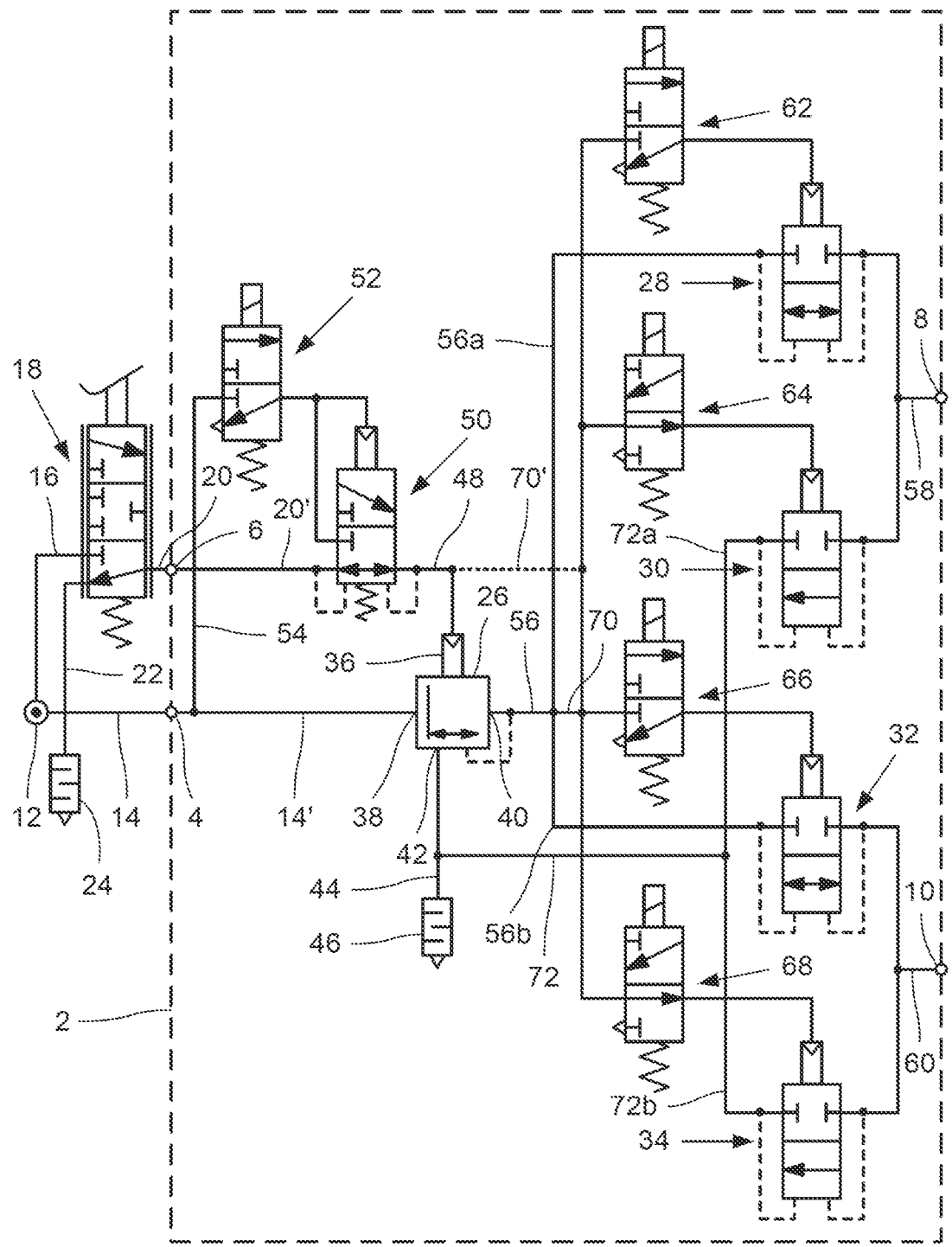

The schematic view of FIG. 3 shows a known embodiment of an axle valve module 2 of a compressed air brake system for actuating the wheel brakes of a vehicle axle of a wheeled vehicle. The axle valve module 2 has a reservoir pressure port 4, an input-side brake pressure port 6, a first output-side brake pressure port 8 for at least one wheel brake cylinder of a wheel brake for the left-hand side of the vehicle axle, and a second output-side brake pressure port 10 for at least one wheel brake cylinder of a wheel brake for the right-hand side of the vehicle axle.

A first reservoir pressure line 14 connected to the reservoir pressure port 4 conducts a reservoir pressure provided by a compressed air source 12. A brake pressure line 20 connected to the input-side brake pressure port 8 conducts a brake pressure which can be set via a connection, continuously adjustable via a brake pedal valve 18, between a second reservoir pressure line 16 connected to the compressed air source 12 or a purge line 22 leading via a silencer 24 into the environment.

The axle valve module 2 comprises a relay valve 26 and a respective ABS inlet valve 28, 32 and a respective ABS outlet valve 30, 34 for at least one wheel brake cylinder of a wheel brake on each side of the vehicle axle. The relay valve 26 has a control pressure input 36, a working pressure input 38, a working pressure output 40, and a purge output 42. The working pressure input 38 is connected to the reservoir pressure port 4 via a reservoir pressure line 14'. The purge output 42 is connected to the environment via a purge line 44 and a silencer 46.

A pressure sensor 41 is connected to the working pressure output 40 of the relay valve 26, the measurement values from which sensor can be conducted to an electronic control unit (not shown) which actuates the directly controlled valves. The measurement values from the pressure sensor 42 allow pressure regulation in the sense of a closed pressure control loop.

A control pressure line 48 connected to the control pressure input 36 can be connected alternately to a brake pressure line 20' connected to the input-side brake pressure port 6 or to the reservoir pressure line 14' via a changeover valve 50, which is configured as a pressure-controlled 3/2-way switching valve, and a pilot valve 52 which is assigned thereto and configured as a cyclically controllable 3/2-way magnetic switching valve.

The control pressure input 36 and a first working pressure input of the changeover valve 50 can be connected via the pilot valve 52 alternately to the environment or to the reservoir pressure line 14' via a connecting line 54. In non-actuated i.e. unpowered state of the pilot valve 52, the control pressure line 48 of the relay valve 26 is connected to the brake pressure line 20' via the changeover valve 50. In the actuated i.e. powered state of the pilot valve 52, the control pressure line 48 of the relay valve 26 is connected to the reservoir pressure line 14' via the changeover valve 50, the pilot valve 52 and the connecting line 54. Thus, depending on the switching state of the changeover valve 50 with corresponding air volume throughput, either the brake pressure introduced by the brake pedal valve 18 into the brake pressure line 20, 20' or the reservoir pressure prevailing in the reservoir pressure line 4' is set at the working pressure output 40 of the relay valve 26. The brake pressure is set at the working pressure output 40 of the relay valve 26 in normal driving mode, in particular when the brake pedal valve 18 is actuated. The reservoir pressure is set at the working pressure output 40 of the relay valve 26, in particular when the brake pedal valve 18 is not actuated, when an activated driving safety function, such as one of the abovementioned systems ASR/ATC, RSC or ESC/ESP, requests an individual actuation of the wheel brakes.

An axle brake line 56 is connected to the working pressure output 40 of the relay valve 26, and its branches 56a, 56b are connected on the input side to the ABS inlet valves 28, 32. On the output side, a wheel brake line 58, 60 leading to the respective output-side brake pressure port 8, 10 is connected to the ABS inlet valves 28, 32. By means of the ABS inlet valves 28, 32, which in the present case are configured as pressure-controlled 2/2-way diaphragm valves, the wheel brake lines 58, 60 can be alternately connected to or blocked against the respective branch 56a, 56b of the axle brake line 56.

A pilot valve 62, 66, which is configured as a cyclically controllable 3/2-way magnetic switching valve, is assigned to each ABS inlet valve 28, 32. Via these pilot valves 62, 66, the respective control pressure input of the ABS inlet valves 28, 32 can be loaded alternately with ambient pressure or with a control pressure taken via a branched control pressure line 70 from the axle brake line 56. In non-actuated i.e. unpowered state of these pilot valves 62, 66, the ABS inlet valves 28, 32 are opened so that the branches 56a, 56b of the axle brake line 56 are connected to the wheel brake lines 58, 60, even though the ABS inlet valves 28, 32 are shown closed in FIG. 3 because of their diaphragm structure. In actuated i.e. powered state of the pilot valves 62, 66, the ABS inlet valves 28, 32 are closed so that the wheel brake lines 58, 60 are then blocked against the branches 56a, 56b of the axle brake line 56.

A further purge line 72 is connected to the purge line 44 of the relay valve 26, and its branches 72a, 72b are connected on the input side to a respective assigned ABS outlet valve 30, 34. On the output side, the wheel brake line 58, 60 leading to the respective output side brake pressure port 8, 10 is connected to the ABS outlet valve 30, 34. Via the ABS outlet valves 30, 34, which are also configured as pressure-controlled 2/2-way diaphragm valves, the wheel brake lines 58, 60 can be alternately connected to or blocked against the respective branch 72a, 72b of the purge line 72.

A pilot valve 64, 68, configured as a cyclically controllable 3/2-way magnetic switching valve, is assigned to each ABS outlet valve 30, 34. Via these pilot valves 64, 68, the respective control pressure input of the ABS outlet valves 30, 34 can be loaded alternately with ambient pressure or with the control pressure taken via the branched control pressure line 70 from the control pressure line 48 of the relay valve 26. In non-actuated i.e. unpowered state of these pilot valves 64, 68, the ABS outlet valves 30, 34 are closed so that the wheel brake lines 58, 60 are blocked against the branches 72a, 72b of the purge line 72. In actuated i.e. powered state of the pilot valves 64, 68, the ABS outlet valves 30, 34 are opened so that the wheel brake lines 58, 60 are then purged via the branches 72a, 72b of the purge line 72.

In an alternative arrangement, the control pressure for the ABS valves 28, 30, 32, 34 may also be taken from the control pressure line 48 leading to the relay valve 26, between the changeover valve 50 and the control pressure input 36. To clarify this alternative connection variant, the input-side branch of the control pressure line 70' is shown in dotted lines.

Figure 1:
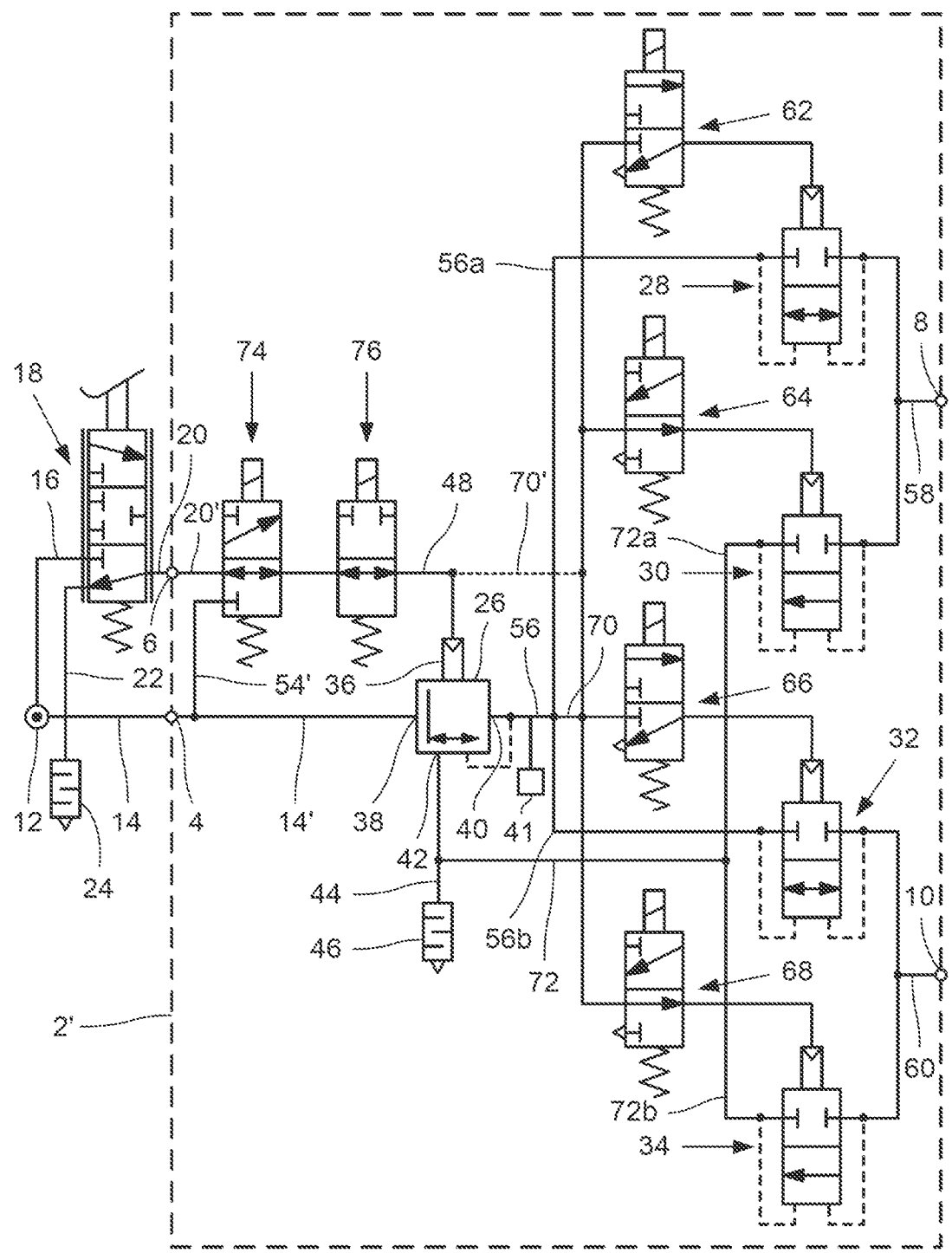
FIG. 1 schematically shows the structure of a first embodiment of an axle valve module according to the present disclosure, FIG. 2 schematically shows the structure of a second embodiment of an axle valve module according to the present disclosure, FIG. 3 schematically shows the structure of a former design of an axle valve module, FIG. 4 schematically shows the structure of a first embodiment of a relay valve module according to the present disclosure, FIG. 5 schematically shows the structure of a second embodiment of a relay valve module according to the present disclosure, FIG. 6 schematically shows the structure of a former design of a relay valve module.

A first embodiment of an axle valve module 2' according to the present disclosure of a compressed air brake system, depicted in the schematic view of FIG. 1, differs from the known design of the axle valve module 2 according to FIG. 3 in that now, instead of the pressure-controlled changeover valve 50, a directly actuatable changeover valve 74 is provided, and a shut-off valve 76 is arranged in the control pressure line 48 leading to the relay valve 26, between the changeover valve 74 and the control pressure input 36 of the relay valve 26 or the branch point of the control pressure line 70' leading to the ABS valves 28, 30, 32, 34.

The changeover valve 74 is now configured as a cyclically controllable 3/2-way magnetic switching valve, by means of which the control pressure line 48, connected to the control pressure input 36 of the relay valve 26, can be connected alternately to the brake pressure line 20' connected to the input-side brake pressure port 6 or to a connecting line 54' connected to the reservoir pressure line 14'. In non-actuated i.e. unpowered state of the changeover valve 74, the control pressure line 48 of the relay valve 26 is connected to the brake pressure line 20'. In actuated i.e. powered state of the changeover valve 74, the control pressure line 48 of the relay valve 26 is connected via the connecting line 54' to the reservoir pressure line 14'. The changeover valve 74 is advantageously structurally identical to the pilot valves 64, 68 for the ABS outlet valves 30, 34, which has advantages with respect to production technology and logistics.

The shut-off valve 76 is configured as a cyclically controllable 2/2-way magnetic switching valve with a compressed air input and a compressed air output, by means of which the control pressure present at the control pressure input 36 of the relay valve 26 can be locked in as required. In non-actuated i.e. unpowered state of the shut-off valve 76, the compressed air input and compressed air output—each of which is connected to a portion of the control pressure line 48 of the relay valve 26—are connected together. In actuated i.e. powered state of the shut-off valve 76, the compressed air input and compressed air output are blocked against each other.

By actuation of the changeover valve 74, an arbitrary control pressure present at the control pressure input 36 of the relay valve 26 can be set, which lies between the brake pressure in the brake pressure line 20, 20' and the reservoir pressure in the reservoir pressure line 14, 14', and can be locked in by actuation of the shut-off valve 76. This brake pressure is then also set at the working pressure output 40 of the relay valve 26 with corresponding air volume throughput. Thus without actuation of the ABS inlet valves 28, 32 (which are open in non-actuated state) and the ABS outlet valves 30, 34 (which are closed in non-actuated state), this brake pressure is also present at the wheel brake cylinders on both sides of the vehicle axle, so that the wheels of the vehicle axle are braked with identical braking force on both sides and destabilization of the wheeled vehicle is avoided. The cost for achieving this symmetrical braking function is very low with the installation of the additional shut-off valve 76.

Figure 2:
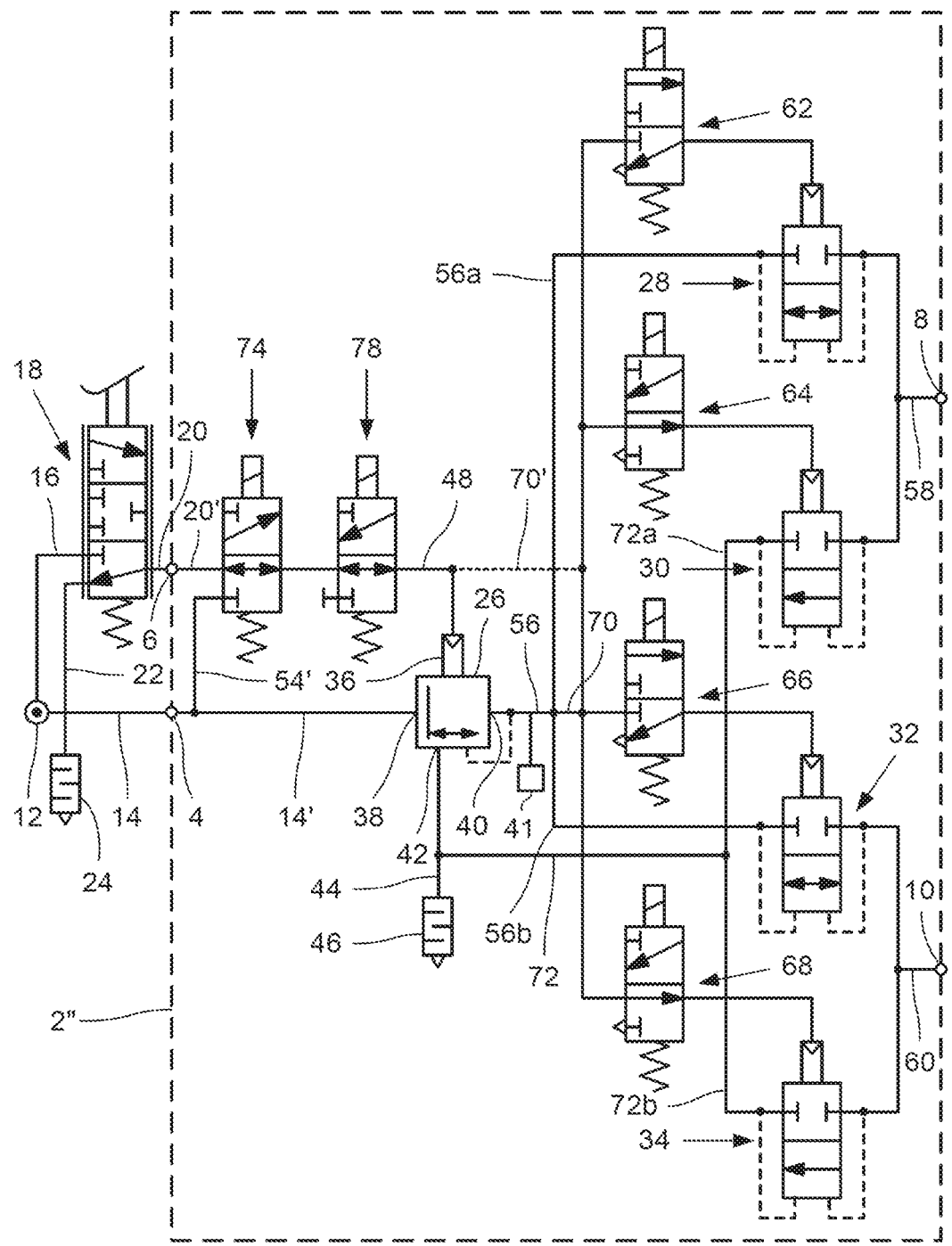

A second embodiment of the axle valve module 2" according to the present disclosure of a compressed air brake system, depicted in the schematic view of FIG. 2, differs from the first exemplary embodiment of the axle valve module 2' according to the present disclosure and as shown in FIG. 1 only in that, with the same function, the shut-off valve 78 arranged in the control pressure line 48 of the relay valve 26 is configured as a cyclically controllable 3/2-way magnetic switching valve with two compressed air inputs and one compressed air output.

In non-actuated i.e. unpowered state of the shut-off valve 78, the first compressed air input and the compressed air output, each of which is connected to a portion of the control pressure line 48 of the relay valve 26, are connected together. In actuated i.e. powered state of the shut-off valve 78, the first compressed air input and the compressed air output are blocked against each other. The second compressed air input of the shut-off valve 78 is permanently blocked and has no function. By use of such a 3/2-way magnetic switching valve for the shut-off function, the shut-off valve 78 can also economically be configured to be structurally identical to the pilot valves 64, 68 of the ABS outlet valves 30, 34 and the changeover valve 74.

Figure 6:
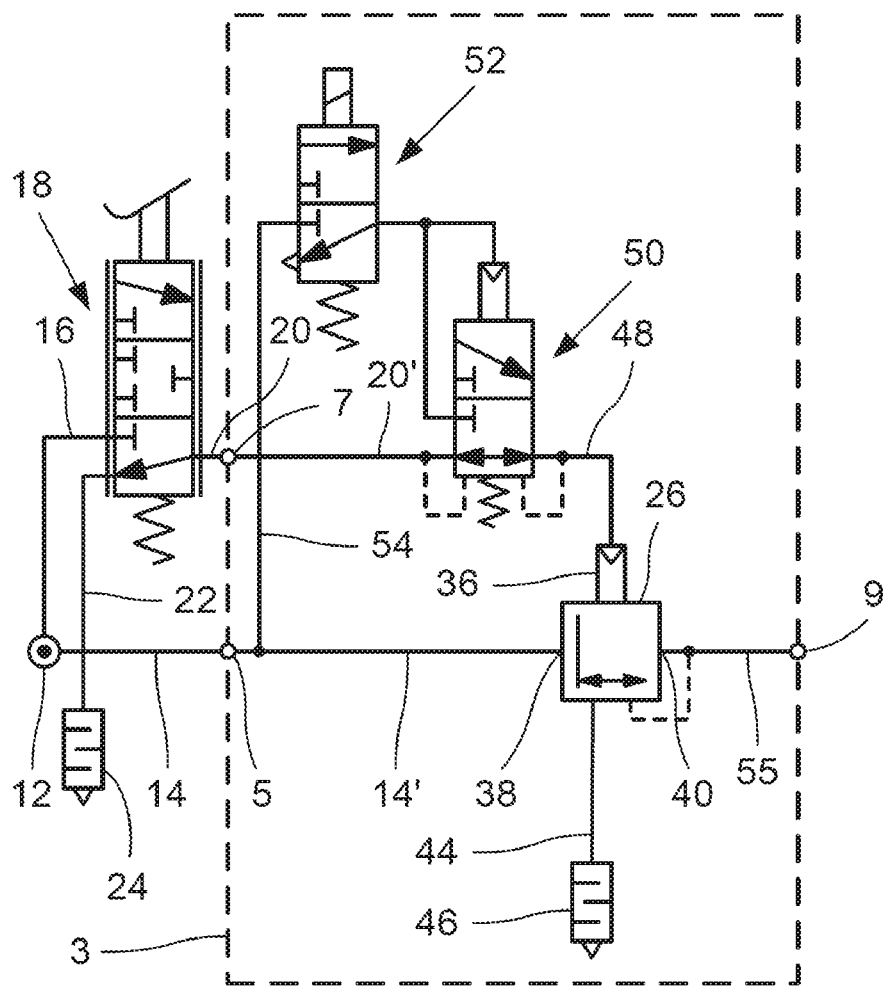

The schematic depiction of FIG. 6 shows a known embodiment of a relay valve module 2 of a compressed air brake system for actuating the wheel brakes of a wheeled vehicle. The relay valve module 3 has a reservoir pressure port 5, an input-side brake pressure port 7, and an output-side brake pressure port 9.

A first reservoir pressure line 14 connected to the reservoir pressure port 5 conducts a reservoir pressure provided by a compressed air source 12. A brake pressure line 20 connected to the input-side brake pressure port 9 conducts a brake pressure which can be set via a connection, continuously adjustable via a brake pedal valve 18, between a second reservoir pressure line 16 connected to the compressed air source 12 or a purge line 22 leading via a silencer 24 into the environment. The output-side brake pressure port 9 is connected via a brake pressure line 55 to the working pressure output 40 of the relay valve 26. The structure and arrangement of the relay valve 26 and changeover valve 50 and its pilot valve 52 correspond to those in the known axle valve module 2 according to FIG. 3, so that here the same reference signs are used and no further description is required.

Figure 4:
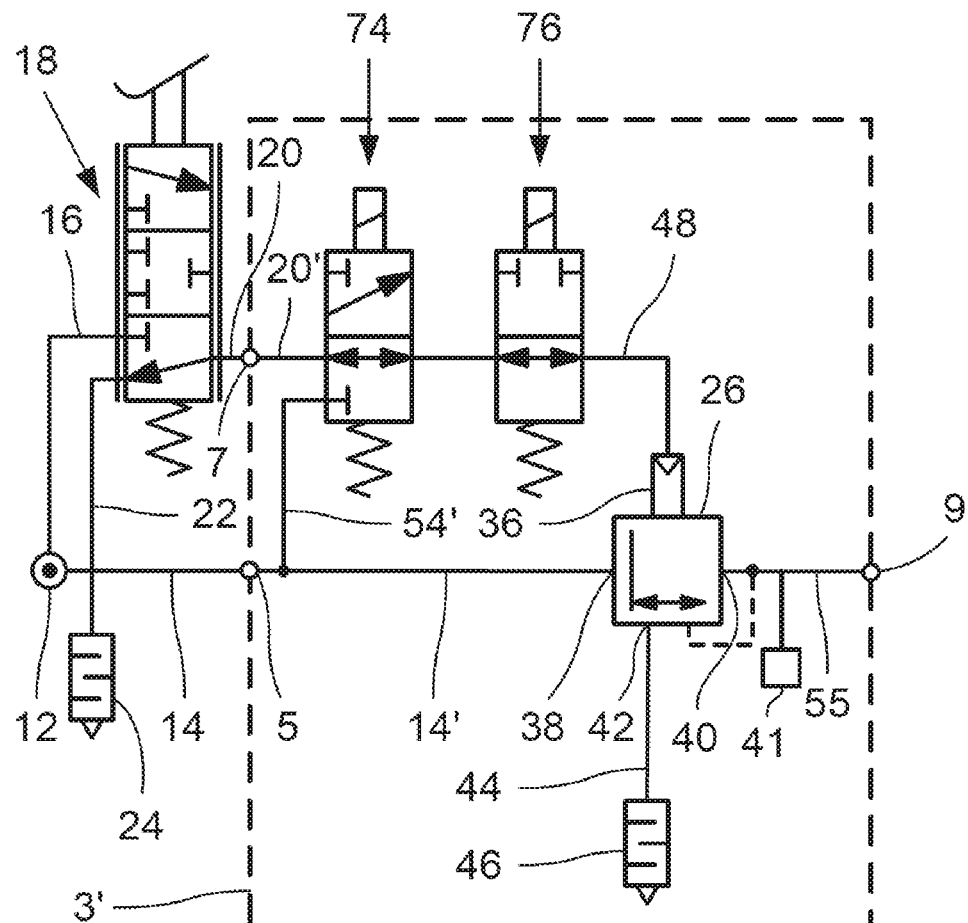

A first embodiment of a relay valve module 3' according to the present disclosure of a compressed air brake system, depicted schematically in FIG. 4, differs from the former design of the relay valve module 3 according to FIG. 6 in that now, instead of the pressure-controlled changeover valve 50, a directly actuatable changeover valve 74 is provided, and a shut-off valve 76 is arranged in the control pressure line 48 leading to the relay valve 26, between the changeover valve 74 and the control pressure input 36 of the relay valve 26.

The changeover valve 74 is now configured as a cyclically controllable 3/2-way magnetic switching valve, via which the control pressure line 48 connected to the control pressure input 36 of the relay valve 26 can be connected alternately to the brake pressure line 20' connected to the input-side brake pressure port 7 or to a connecting line 54' connected to the reservoir pressure line 14'. The shut-off valve 76 is configured as a cyclically controllable 2/2-way magnetic switching valve with a compressed air input and a compressed air output, via which the control pressure present at the control pressure input 36 of the relay valve 26 can be locked in if required. The functions of the changeover valve 74 and shut-off valve 76 correspond to those of the respective valves in the axle valve module 2' according to FIG. 1.

In this relay valve module 3' too, a pressure sensor 41 is connected to the working pressure output 40 of the relay valve 26, the measurement values from which sensor can be conducted to an electronic control unit (not shown) which actuates the directly controlled valves. The measurement values of the pressure sensor 42 allow pressure regulation in the sense of a closed pressure control loop.

Figure 5:
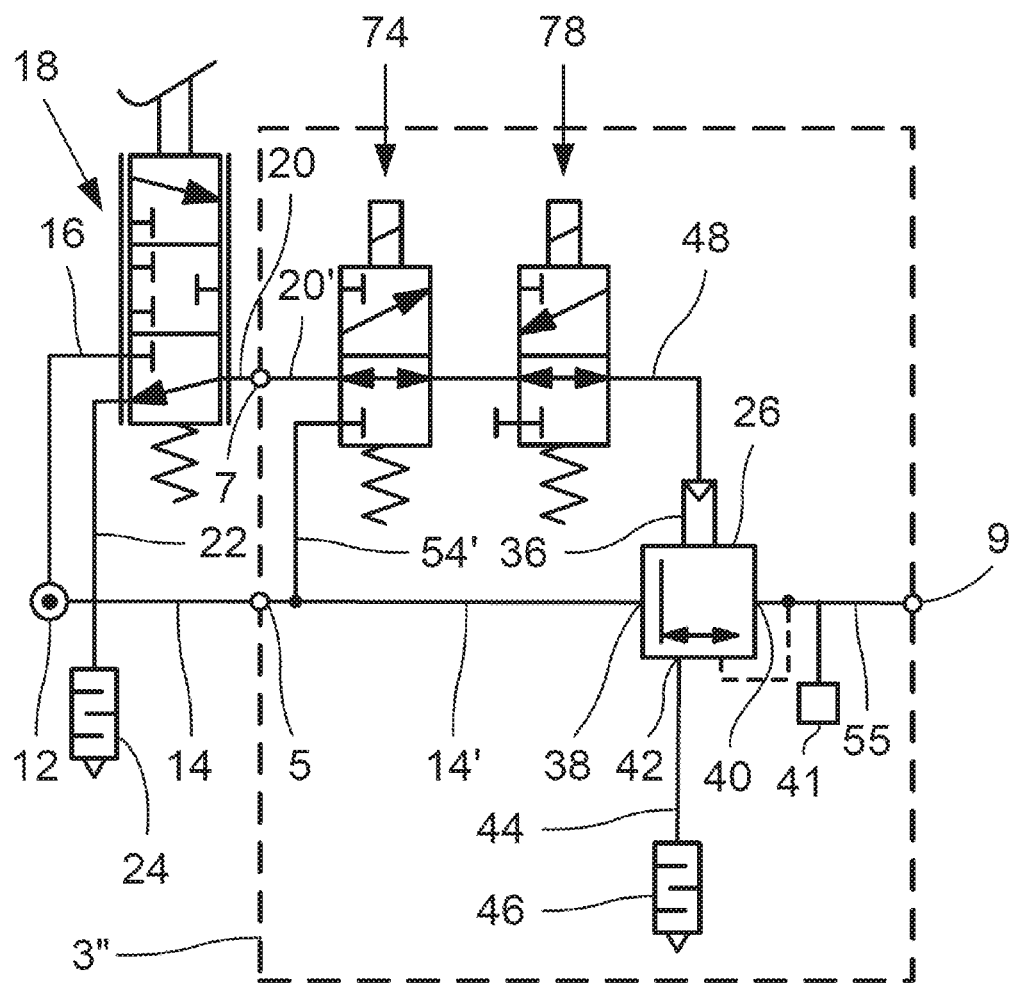

A second embodiment of the relay valve module 3" according to the present disclosure of a compressed air brake system, depicted in the schematic view of FIG. 5, differs from the first exemplary embodiment of the relay valve module 3' according to the present disclosure as shown in FIG. 4 only in that, with the same function, a shut-off valve 78 arranged in the control pressure line 48 leading to the relay valve 26 is configured as a cyclically controllable 3/2-way magnetic switching valve with two compressed air inputs and one compressed air output, the second compressed air input of which is permanently blocked and has no function. The functions of the changeover valve 74 and shut-off valve 78 correspond to those of the respective valves in the axle valve module 2" according to FIG. 2. By the use of such a 3/2-way magnetic switching valve for the shut-off function, the changeover valve 74 and shut-off valve 78 can economically be configured to be structurally identical.

While the above description constitutes the preferred embodiments of the present invention, it will be appreciated that the invention is susceptible to modification, variation and change without departing from the proper scope and fair meaning of the accompanying claims.

What is claimed is:

1. An axle valve module (2', 2") for a compressed air brake system for actuating wheel brakes of a vehicle axle of a wheeled vehicle, the axle valve module comprising:
   a relay valve (26), and
   a control pressure input (36) connected to a control pressure line (48) configured to be alternately connected via a changeover valve (50, 74) to a brake pressure line (20, 20') conducting an introduced brake pressure or to a reservoir pressure line (14, 14') conducting a reservoir pressure, and with an ABS inlet valve (28, 32) and an ABS outlet valve (30, 34) for at least one wheel brake cylinder on each side of the vehicle axle, wherein each of the ABS inlet and outlet valves is formed as a pressure-controlled diaphragm valve with an associated pilot valve (62, 64, 66, 68), wherein the pilot valves (62, 64, 66, 68) are configured as cyclically controllable 3/2-way magnetic switching valves configured to load a the control pressure chamber of the associated diaphragm valve (28, 30, 32, 34) with a control pressure alternatively taken from an axle brake line (56) connected to a working pressure output (40) of the relay valve (26) or from the control pressure line (48) of the relay valve (26), or with ambient pressure, wherein a shut-off valve (76, 78) is arranged in the control pressure line (48) leading to the relay valve (26), between the changeover valve (50, 74) and the control pressure input (36) of the relay valve (26) or a branch point of an ABS control pressure line (70') for the ABS inlet and outlet valves (28, 30, 32, 34), the shut-off valve being configured to selectively lock in the control pressure present at the control pressure input (36) of the relay valve (26);

wherein no bypass pressure line is provided from the relay valve such that the control pressure present at the control pressure input is selectively locked in by the shut-off valve; and wherein the changeover valve (74) is configured as a cyclically controllable 3/2-way magnetic switching valve with a non-actuated state and an actuated state, with a first compressed air input to which the brake pressure line (20') is connected, with a second compressed air input to which the reservoir pressure line (14') is connected, and with a compressed air output to which the control pressure line (48) of the relay valve (26) is connected, wherein the first compressed air input is connected to the compressed air output in the non-actuated state and is blocked therefrom in the actuated state, and the second compressed air input is blocked against the compressed air output in the non-actuated state and connected thereto in the actuated state;

wherein the changeover valve is biased toward the non-actuated state.

2. The axle valve module as claimed in claim 1, wherein the shut-off valve (76) is configured as a cyclically controllable 2/2-way magnetic switching valve with compressed air input and output, each of which is connected to a portion of the control pressure line (48) of the relay valve (26), and which are connected together in a non-actuated state and blocked against each other in an actuated state.

3. The axle valve module as claimed in claim 1, wherein the changeover valve (74) is structurally identical to at least one of the shut-off valve (78), the pilot valves (64, 68) of the ABS outlet valves (30, 34), and the pilot valves (62, 66) of the ABS inlet valves (28, 32).

4. An axle valve module (2', 2") for a compressed air brake system for actuating wheel brakes of a vehicle axle of a wheeled vehicle, the axle valve module comprising:
   a relay valve (26), and
   a control pressure input (36) connected to a control pressure line (48) configured to be alternately connected via a changeover valve (50, 74) to a brake pressure line (20, 20') conducting an introduced brake pressure or to a reservoir pressure line (14, 14') conducting a reservoir pressure, and with an ABS inlet valve (28, 32) and an ABS outlet valve (30, 34) for at least one wheel brake cylinder on each side of the vehicle axle, wherein each of the ABS inlet and outlet valves is formed as a pressure-controlled diaphragm valve with an associated pilot valve (62, 64, 66, 68), wherein the pilot valves (62, 64, 66, 68) are configured as cyclically controllable 3/2-way magnetic switching valves configured to load a the control pressure chamber of the associated diaphragm valve (28, 30, 32, 34) with a control pressure alternatively taken from an axle brake line (56) connected to a working pressure output (40) of the relay valve (26) or from the control pressure line (48) of the relay valve (26), or with ambient pressure, wherein a shut-off valve (76, 78) is arranged in the control pressure line (48) leading to the relay valve (26), between the changeover valve (50, 74) and the control pressure input (36) of the relay valve (26) or a branch point of an ABS control pressure line (70') for the ABS inlet and outlet valves (28, 30, 32, 34), the shut-off valve being configured to selectively lock in the control pressure present at the control pressure input (36) of the relay valve (26);

wherein the shut-off valve (78) is configured as a cyclically controllable 3/2-way magnetic switching valve with two compressed air inputs and one compressed air output, in which the first compressed air input and the compressed air output, each of which is connected to a portion of the control pressure line (48) of the relay valve (26), are connected together in a non-actuated state and blocked against each other in an actuated state, and the second compressed air input is permanently blocked.

5. The axle valve module as claimed in claim 4, wherein the shut-off valve (78) is structurally identical to the pilot valves (64, 68) of the ABS outlet valves (30, 34) or the pilot valves (62, 66) of the ABS inlet valves (28, 32).

* * * * *